United States Patent [19]

Harris

[11] Patent Number: 5,052,075
[45] Date of Patent: Oct. 1, 1991

[54] APPARATUS AND METHOD FOR SECURING A CASTER TO AN OBJECT HAVING A HOLE

[75] Inventor: Charles A. Harris, Evansville, Ind.

[73] Assignee: Babcock Industries Inc., Fairfield, Conn.

[21] Appl. No.: 463,504

[22] Filed: Jan. 11, 1990

[51] Int. Cl.⁵ .................. B60B 29/00; B60B 33/00
[52] U.S. Cl. .................................. 16/38; 16/39; 16/43
[58] Field of Search ...................... 16/38, 39, 43

[56] References Cited

U.S. PATENT DOCUMENTS

| D. 26,112 | 9/1896 | Denton . | |
|---|---|---|---|
| D. 32,291 | 2/1900 | Clark . | |
| 665,705 | 1/1901 | Summerer . | |
| 836,199 | 11/1906 | Morris | 16/21 X |
| 888,040 | 5/1908 | Sabo | 16/39 |
| 1,223,877 | 4/1917 | Hilfrank . | |
| 1,470,858 | 10/1923 | Maxwell | 16/43 |
| 1,649,526 | 11/1927 | Herold . | |
| 1,753,183 | 4/1930 | Johnson . | |
| 1,927,271 | 9/1933 | Noelting et al. . | |
| 2,169,882 | 8/1939 | Noelting et al. | 16/38 |
| 2,173,950 | 9/1939 | Parkhill . | |
| 2,179,912 | 11/1939 | Woodruff . | |
| 2,272,848 | 2/1942 | Miller . | |
| 2,294,807 | 9/1942 | Schultz, Jr. . | |
| 2,520,375 | 8/1950 | Roe . | |
| 2,704,682 | 3/1952 | Davis . | |
| 3,128,495 | 4/1964 | Tooth . | |
| 3,197,802 | 8/1965 | Fontana et al. . | |
| 3,942,220 | 3/1976 | Wood et al. . | |
| 4,805,260 | 2/1989 | Tooth . | |

FOREIGN PATENT DOCUMENTS 2107961 8/1972 Fed. Rep. of Germany .......... 16/38

OTHER PUBLICATIONS

Outwater Plastics Catalog 1981-A, p. 44, 1981.

Primary Examiner—Robert L. Spruill
Assistant Examiner—Carmine Cuda
Attorney, Agent, or Firm—Woodard, Emhardt, Naughton, Moriarty & McNett

[57] ABSTRACT

An apparatus for securing a caster to an object having a hole with interior walls has a tubular body with upper and lower ends, the lower end being adapted to connect to a caster and the upper end being split and defining at least two upwardly extending friction grip arms, the upper end of each arm defining an outwardly extending friction grip portion and the outer dimension defined by all of the friction grip portions being slightly larger than the minimum corresponding dimension of the hole.

20 Claims, 1 Drawing Sheet

APPARATUS AND METHOD FOR SECURING A CASTER TO AN OBJECT HAVING A HOLE

FIELD OF THE INVENTION

The present relates to the field of caster hardware and in particular to friction grip caster sockets for securing casters to furniture legs and the like.

BACKGROUND OF THE INVENTION

Caster devices are generally secured to the bottom of tubular legs either by one-piece or multiple-piece caster sockets or by multiple-piece expansion devices. For example, in U.S. Pat. No. 4,805,260, a slotted sleeve is disposed within the bottom of a tubular leg. A caster-stem or bolt, extending upwardly from a caster, extends through the sleeve and is threaded into a conical expander, the expander extending down through a central passage in the sleeve. As the bolt is rotated, the conical expander is drawn toward the caster, thereby expanding the sleeve against the interior walls of the leg and tightly securing the caster and expander device to the leg. A similar device is shown in U.S. Pat. No. 2,173,950.

Typical of the one-piece caster sockets are the devices shown in U.S. Pats. Nos. 2,294,807, 2,169,882, and 1,649,526. In these patents, the caster socket is generally tubular with an outwardly extended flange at its base and is split upwardly from its bottom to a point relatively close to a domed upper end, thereby forming two, somewhat resilient and inwardly deformable sections. The socket may then be inserted into a hole defined in the furniture, the lower sections of the socket deforming slightly inwardly, thereby providing a friction fit to hold the socket in place within the hole. In U.S. Pat. No. 3,128,495, a caster socket has a body having no slits and having, at its top and bottom, a series of incompressible, radially outwardly extending splines. The upper and lower portions of the socket are thin walled, allowing them to deform slightly inwardly upon insertion into a tubular member to provide an internal friction grip.

While the multiple piece expansion devices provide a means for securing a caster to a tubular member, they can be expensive and somewhat time consuming to assemble and install. The one-piece caster sockets, on the other hand, may be less expensive and easier to install, but they may not be as reliable or long lasting.

What is needed is an inexpensive, easy to use and long-lasting device for securing casters to furniture and the like.

SUMMARY OF THE INVENTION

Generally speaking, a caster socket is provided for securing a caster to an article of furniture or the like.

A caster socket has a tubular body with upper and lower ends, the lower end being adapted for securement to the upstanding stem of a caster and the upper end being split and defining at least two upwardly extending friction grip arms, each arm defining an outwardly extending friction grip portion. The outer dimension defined by the combined friction grip portions is slightly larger than the corresponding inner dimension of the hole or recess in the particular object to which the caster will be attached. The socket may be inserted into the hole or recess, upper end first, causing the grip arms to deform inwardly and allowing the socket to be completely inserted into the hole or recess. In one embodiment, a caster may then be attached to the socket by screwing the threaded, upstanding stem into a threaded passageway in the bottom of the socket.

It is an object of the present invention to provide an improved device for securing casters to articles of furniture and the like.

It is another object of the present invention to provide an inexpensive and easy to use device for securing casters to articles of furniture and the like.

Further objects and advantages of the present invention will become apparent from the following description of the preferred embodiment.

DESCRIPTION OF THE PREFERRED EMBODIMENT

Figure 1:
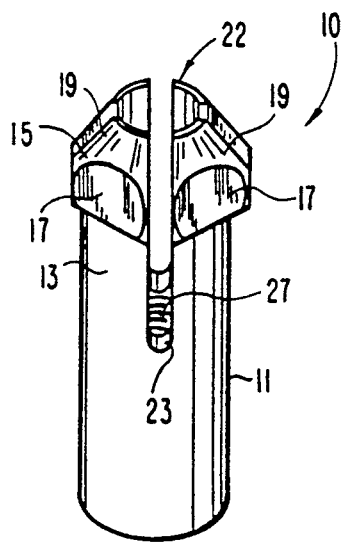
FIG. 1 is a perspective view of a caster socket in accordance with the preferred embodiment of the present invention.
Figure 2:
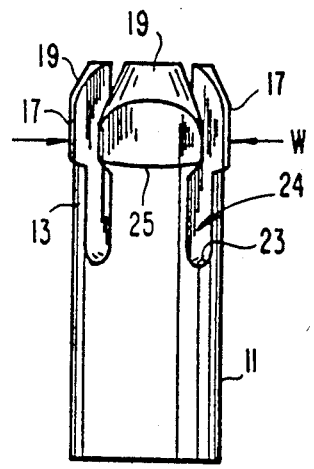
FIG. 2 is an elevational view of the caster socket of FIG. 1, rotated 45 degrees therefrom.
Figure 5:
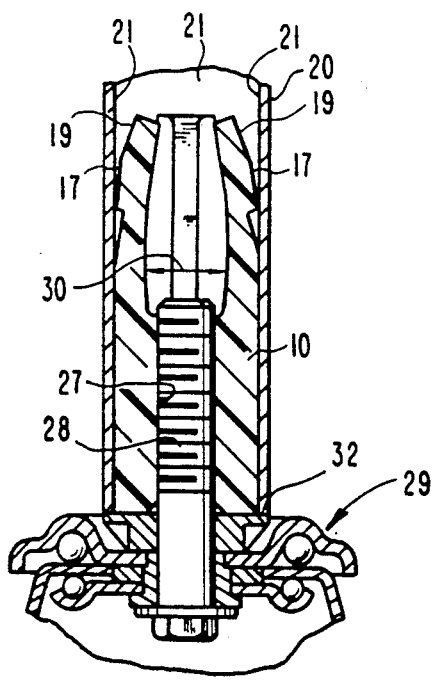
FIG. 5 is a side, cross-sectional view of the caster socket of FIG. 4, cross-section being taken along the lines 5—5 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
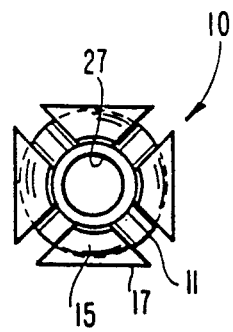
FIG. 3 is a top view of the caster socket of FIG. 2.
Figure 4:
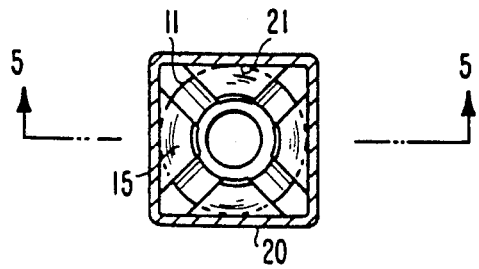
FIG. 4 is a top view of the caster socket of FIG. 2 and shown connected to a caster assembly and installed within a tubular furniture leg.

Referring now to FIGS. 1 through 5, there is shown a friction grip caster socket 10 in accordance with the preferred embodiment of the present invention. Socket 10 is a one-piece device which is adapted for insertion into a square cross-sectioned, tubular member such as the bottom end of a table leg, and is adapted for receiving and holding the pintle or stem of a caster. Socket 10 generally includes a tubular body 11, the upper portion of which is split to form four, spaced apart, upwardly extending friction grip arms 13. At the top of each arm 13 is an outwardly extending friction grip portion 15. Each grip portion 15 defines an outwardly facing, flat friction grip surface 17. Each grip surface 17 is oriented 90 degrees with respect to the grip surface 17 of an adjacent arm 13 and is adapted to correspond with one corresponding interior wall of the mating, square cross-sectioned tubular leg 20 (FIG. 3). Above grip surface 17, each grip portion 15 defines an arcuate and beveled guide surface 19. In combination, the four guide surfaces 19 of grip arms 13 form a frustoconical leading end 22 for facilitating entry of socket 10 into a tubular member such as table leg 20 or into any desired object having an appropriately shaped hole.

In the present embodiment, socket 10 is designed to be installed into a tubular leg 20 which has interior walls 21 and a square cross-section. In its uninstalled condition (FIGS. 1 and 2), the outer diameter of cylindrical body 11 below grip portions 15 is substantially constant and is substantially equal to the width defined between opposing interior walls 21 of leg 20. The width W of socket 10 measured between opposing friction grip surfaces 17 (FIG. 2) is approximately between 1/16 and ⅛ greater than the diameter of tubular body 11, and therefore approximately between 1/16 and ⅛ greater than the distance between opposing interior walls 21 of tubular leg 20.

Caster socket 10 is molded from an appropriate engineering resin. The composition of socket 10, the wall thickness of arms 13, and the vertical distance between the bases 23 of slots 24 and the bottom edges 25 of grip surfaces 17 are designed to permit a stiffly resilient, inward deformation of arms 13 and a fairly substantial spring force in resistance thereto.

Below bases 23 of slots 24, body 11 defines a threaded bore 27 which is adapted to receive the threaded stem of a conventional caster assembly 29. The interior diameter 30 of the passageway defined by grip arms 13 is greater than the outer diameter of threaded stem 28. Stem 28 is thus allowed to extend upwardly somewhat, into the passageway amid arms 13, without interfering with the inward deformation of arms 13.

In operation, threaded stem 28 of caster assembly 29 may be screwed up into caster socket 10 until assembly 29 is firmly secured to socket 10. Socket 10, with assembly 29 attached, is then inserted into tubular leg 20, with guide surfaces 19 facilitating entry of the leading end 22. (Socket 10 may, of course, be inserted before the caster assembly is attached). As the greater dimensioned grip portions 15 contact the lower end 32 of tubular leg 20, beveled surfaces 19 cam arms 13 inwardly, allowing socket 10 to be forcibly inserted up into tubular leg 20. The stiffly resilient nature of inwardly deformed arms 13 creates concentrated frictional forces between grip surfaces 17 and inner walls 21. Since the frictional forces are exerted at the upper end of socket 10, even if caster assembly 29 and socket 10 were partially dislodged from tubular leg 20, the frictional forces would continue to be exerted between surfaces 17 and walls 21 until socket 10 was substantially completely removed from tubular leg 20. Because the outer diameter of tubular body 11 is substantially equal to the distance between the opposing walls 21 of leg 20, caster socket 10 is laterally stable within leg 20.

While the present embodiment is described and shown having caster stem 28 threadedly secured to caster socket 10, alternative embodiments are contemplated wherein caster assembly 29 may be secured to socket 10 in other appropriate and conventional manners.

Alternative embodiments are also contemplated wherein the shape of body 11, the number of arms 13, and the angular relationship among friction grip surfaces 17 are adapted for installation within a tubular member having other than square cross section. For example, a socket 10 may have a round tubular body, two or more arms 13, and friction surfaces 17 which are arcuate, all for frictional engagement within a round cross-sectioned tubular member.

While socket 10 has been described herein as being designed for insertion into a tubular member such as leg 20, it is also contemplated that socket 10 may be installed within an appropriately sized hole in any object to which it is desired that a caster be attached.

While the invention has been illustrated and described in detail in the drawings and foregoing description, the same is to be considered as illustrative and not restrictive in character, it being understood that only the preferred embodiment has been shown and described and that all change and modifications that come within the spirit of the invention are desired to be protected.

What is claimed is:

1. An apparatus for securing a caster to an object having a hole with parallel interior walls and a constant, minimum interior width along the height of the apparatus for securing the caster, comprising:

a tubular body having upper and lower ends, the lower end having connection means for connecting to a caster and the upper end being split and defining at least two upwardly extending friction grip arms, and wherein the lower end has an external cross-sectional width which is substantially equal to the interior width of the hole to provide lateral stability of said tubular body within the hole;

a caster having an upward stem accurable to said means for connecting within the lower end of the tubular body;

wherein the friction grip arms project radially outward beyond the external cross-sectional width of the lower end when the tubular body is outside of the hole, and wherein upon axial insertion of the tubular body into the hole the interior walls of the hole bear against the friction grip arms and urge them radially inward, providing a friction fit between the friction grip arms and the interior walls; and wherein an interior diameter of the upper end of the tubular body is greater than an outer diameter of the caster stem to allow the friction arms to deflect radially inwardly without obstruction by the stem.

2. The apparatus of claim 1 wherein the apparatus is adapted to be inserted, upper end first, into a hole of an object, and to be firmly held thereat by frictional forces exerted between the grip portions and the walls 3. The apparatus of claim 2 wherein the hole has a rectangular cross-section and each grip arm defines an outwardly facing, substantially flat grip surface, wherein there are four friction grip arms alignable with respective walls of the hole, and wherein an outer width defined between grip surfaces of opposing grip portions is slightly greater than the minimum interior width of the hole.

4. The apparatus of claim 3 wherein the outer width is approximately between 1/16 and ⅛ inches greater than the minimum width of the hole.

5. The apparatus of claim 3 wherein said body below the friction grip surfaces is cylindrical and has a diameter approximately equal to the minimum interior width of the hole.

6. The apparatus of claim 2 wherein each friction grip portion further defines a beveled guide surface above the grip surface.

7. The apparatus of claim 1 wherein said connection means includes a central threaded passageway adapted to securely engage with the stem of a caster.

8. An apparatus for securing a caster to an object having a hole with interior walls, consisting essentially of:

a tubular body having a lower end which includes connection means for connecting to a stem of a caster and an upper end which includes at least two upwardly extending friction grip arms, the upper end of each of said arms defining an outwardly extending friction grip portion, and wherein an interior diameter of the upper end of the tubular body is greater than an outer diameter of the stem to allow the friction arms to deflect radially inwardly without obstruction by the stem, and wherein the tubular body is adapted to be inserted, upper end first, into the hole of an object and is adapted to be firmly held thereat by frictional forces exerted between the grip portions and the walls of the hole.

9. The apparatus of claim 8 wherein the grip portions define a circumferential dimension which is slightly greater than the corresponding interior dimension defined by the walls of the hole.

10. The apparatus of claim 9 wherein the hole has a rectangular cross-section and there are four friction grip arms alignable with corresponding walls of the hole.

11. The apparatus of claim 10 wherein each grip portion defines an outwardly facing, substantially flat grip surface adapted to frictionally engage with a corresponding wall of the hole.

12. A method for securing a caster to an object having a hole with interior walls and a minimum interior width, comprising the steps of:
providing a friction grip caster socket having a tubular body and upper and lower ends, the lower end of said body defining connection means for connecting to a stem of a caster, the upper end of said body being split and defining at least two upwardly extending friction grip arms and the upper end of each of said arms defining an outwardly extending friction grip portion and a beveled guide surface, wherein the lower end is below the split and has an external cross-sectional width which is substantially equal to the interior width of the hole to provide lateral stability of said tubular body within the hole;
connecting a caster to said caster socket at said connection means by inserting the stem within the lower end of the socket; and,
securing said caster socket to an object having a hole by bending the grip arms inwardly while sliding said caster socket, upper end first, into the hole without obstructing the inward bending of the grip arms by the stem.

13. The method of claim 12 wherein said providing step includes each grip arm defining an outwardly facing grip surface shaped for mutually abutting engagement with a portion of the interior walls of the hole, said providing step further including said socket having an outer width defined between grip surfaces of opposing grip portions which is slightly greater than the minimum interior width of the hole.

14. The method of claim 13 wherein said providing step includes the outer width being approximately between 1/16 and ⅛ inches greater than the minimum interior width of the hole.

15. The method of claim 12 wherein the hole has a rectangular cross-section and wherein said providing step includes each grip arm defining an outwardly facing, substantially flat grip surface, the caster socket having four friction grip arms alignable with respective walls of the hole, and an outer width defined between grip surfaces of opposing grip portions being slightly greater than the minimum interior width of the hole.

16. The method of claim 15 wherein said providing step includes the body below the friction grip surfaces being cylindrical and having a diameter approximately equal to the minimum interior width of the hole.

17. The method of claim 16 wherein said providing step includes each friction grip portion further defining a beveled guide surface above the grip surface.

18. The method of claim 15 wherein said providing step includes the outer width being between 1/16 and ⅛ inches greater than the minimum interior width of the hole.

19. The method of claim 12 wherein said providing step includes said connection means including a central threaded passageway adapted to securely engage with the stem of a caster.

20. The method of claim 12 wherein the hole is surrounded by solid structure of the object and wherein said securing step includes the bending of grip arms being performed by axially pushing the socket into the hole such that the beveled guide surfaces cam against the solid structure surrounding the hole and force the arm inwardly.

* * * * *